(12) United States Patent
Dietrich

(10) Patent No.: US 8,220,239 B2
(45) Date of Patent: Jul. 17, 2012

(54) OFFSET GUARD BOLT ATTACHMENT SYSTEM

(76) Inventor: Dave Dietrich, Saskatchewan (CA)

( * ) Notice: Subject to any disclaimer, the term of this patent is extended or adjusted under 35 U.S.C. 154(b) by 0 days.

(21) Appl. No.: 12/737,706

(22) PCT Filed: Aug. 7, 2009

(86) PCT No.: PCT/CA2009/001100
§ 371 (c)(1),
(2), (4) Date: Mar. 21, 2011

(87) PCT Pub. No.: WO2010/015083
PCT Pub. Date: Feb. 11, 2010

(65) Prior Publication Data
US 2011/0179760 A1 Jul. 28, 2011

(30) Foreign Application Priority Data
Aug. 8, 2008 (CA) .................................. 2638565

(51) Int. Cl.
*A01D 34/00* (2006.01)
(52) U.S. Cl. .......................................................... 56/312
(58) Field of Classification Search ............... 56/312, 56/298, 313, 310, 296, 299, 259
See application file for complete search history.

(56) References Cited

U.S. PATENT DOCUMENTS

| | | | | |
|---|---|---|---|---|
| RE2,594 E | * | 5/1867 | Wheeler, Jr | 56/309 |
| 1,258,740 A | * | 3/1918 | Blocki | 56/313 |
| 2,008,895 A | * | 7/1935 | Braasch et al. | 56/298 |
| 2,099,471 A | * | 11/1937 | Edgington | 56/312 |
| 2,187,438 A | * | 1/1940 | Wilcox | 56/313 |
| 2,214,965 A | * | 9/1940 | Love | 56/313 |
| 2,576,122 A | * | 11/1951 | Kenison | 56/312 |
| 2,577,324 A | * | 12/1951 | Goesch | 56/312 |
| 2,734,332 A | * | 2/1956 | Fisher | 56/312 |
| 2,892,298 A | * | 6/1959 | Chaney | 56/314 |
| 2,960,814 A | * | 11/1960 | Babcock | 56/312 |
| 3,163,975 A | * | 1/1965 | Lightsey | 56/313 |
| 3,490,215 A | * | 1/1970 | Chapman et al. | 56/298 |
| 3,508,388 A | * | 4/1970 | Buchholz | 56/297 |
| 3,579,967 A | * | 5/1971 | Schumacher | 56/313 |
| 3,788,051 A | * | 1/1974 | Richardson | 56/318 |

(Continued)

FOREIGN PATENT DOCUMENTS

CA        2 524 343        7/2006

(Continued)

OTHER PUBLICATIONS

International Search Report for PCT/CA2009/001100, mailed Nov. 30, 2009.

*Primary Examiner* — Arpad Fabian-Kovacs
(74) *Attorney, Agent, or Firm* — Nixon & Vanderhye P.C.

(57) ABSTRACT

A guard finger attachment apparatus for attaching a crop accessory to a cutting header where guard bolts attaching guards to the header are offset from guard fingers of the guards where the crop accessory is adapted for engagement with a header attachment member and a guard finger when the header attachment member is aligned with the guard finger. The apparatus includes a plate attachable to the header by guard bolts, and header engagement members attached to the plate and configured such that when the plate is attached to the guard bolts, the header engagement members are aligned with corresponding guard fingers.

12 Claims, 2 Drawing Sheets

U.S. PATENT DOCUMENTS

| | | | |
|---|---|---|---|
| 3,834,139 A * | 9/1974 | Schumacher et al. | 56/313 |
| 3,913,306 A * | 10/1975 | Schumacher et al. | 56/313 |
| 3,995,413 A * | 12/1976 | Lynch | 56/119 |
| 4,120,138 A | 10/1978 | Schumacher, II et al. | |
| 4,644,738 A * | 2/1987 | Krambeck et al. | 56/259 |
| 5,005,346 A * | 4/1991 | Medernach | 56/312 |
| 5,105,610 A * | 4/1992 | Britten | 56/298 |
| 5,209,053 A * | 5/1993 | Verbeek | 56/298 |
| 5,809,759 A * | 9/1998 | Zyla et al. | 56/298 |
| 5,906,091 A * | 5/1999 | Gemar | 56/119 |
| 5,943,849 A * | 8/1999 | Billheimer | 56/119 |
| 5,979,152 A * | 11/1999 | McCredie | 56/298 |
| 6,244,026 B1 * | 6/2001 | Minnihan et al. | 56/119 |
| 6,510,681 B2 * | 1/2003 | Yang et al. | 56/298 |
| 6,691,499 B2 * | 2/2004 | Schumacher et al. | 56/312 |
| 6,708,477 B2 * | 3/2004 | Schumacher et al. | 56/307 |
| 7,520,119 B2 * | 4/2009 | Yanko | 56/312 |
| 7,650,738 B2 * | 1/2010 | Dietrich | 56/314 |

FOREIGN PATENT DOCUMENTS

GB     1 335 183     10/1973

\* cited by examiner

OFFSET GUARD BOLT ATTACHMENT SYSTEM

This application is the U.S. national phase of International Application No. PCT/CA2009/001100, filed 7 Aug. 2009, which designated the U.S. and claims priority to CA Application No. 2638565, filed 8 Aug. 2008, the entire contents of each of which are hereby incorporated by reference.

This invention is in the field of agricultural implements and in particular harvest headers used for cutting crop plants.

BACKGROUND

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

Crop accessories such as crop lifters are also conveniently attached to the guard fingers and the guard bolts that attach the guard to the header. Examples of such lifters are illustrated in U.S. Pat. No. 4,120,138 to Schumacher, and in Canadian Patent Number 2,524,343 to the present inventor Dietrich.

In order to mount these crop lifters the guard finger and mounting bolt must be aligned. On the majority of headers the guard bolts and fingers are aligned and the standard crop lifters, which are readily available, can be used. On some harvest headers however, the guard bolts are offset to one side or the other from the guard finger, and so the standard crop lifter cannot be attached, and more costly and less convenient options must be used.

SUMMARY OF THE INVENTION

It is an object of the present invention to provide an offset guard bolt attachment system that overcomes problems in the prior art.

In a first embodiment the present invention provides a guard finger attachment apparatus for attaching a crop accessory to a cutting header where guard bolts attaching guards to the header are offset from guard fingers of the guards where the crop accessory is adapted for engagement with a header attachment member and a guard finger when the header attachment member is aligned with the guard finger. The apparatus comprises a plate attachable to the header by at least one guard bolt, and at least one header engagement member attached to the plate and configured such that when the plate is attached to the at least one guard bolt, the at least one header engagement member is aligned with a guard finger.

In a second embodiment the present invention provides a cutting header apparatus comprising a header including guard bolts attaching guards with guard fingers to the header, wherein at least one guard finger of at least one guard is offset from guard bolts attaching the at least one guard to the header. A plate is attached to the header by the guard bolts attaching the at least one guard to the header, and a header engagement member is attached to the plate and configured such that the header engagement member is aligned with an offset guard finger of the at least one guard. A crop accessory is engaged with the header attachment member and is engaged with the aligned offset guard finger.

Thus the invention provides a simple and economical apparatus that can be configured to provide an aligned guard finger and header attachment member on a header of the type where the guard bolts and guard fingers are offset in the operating travel direction.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
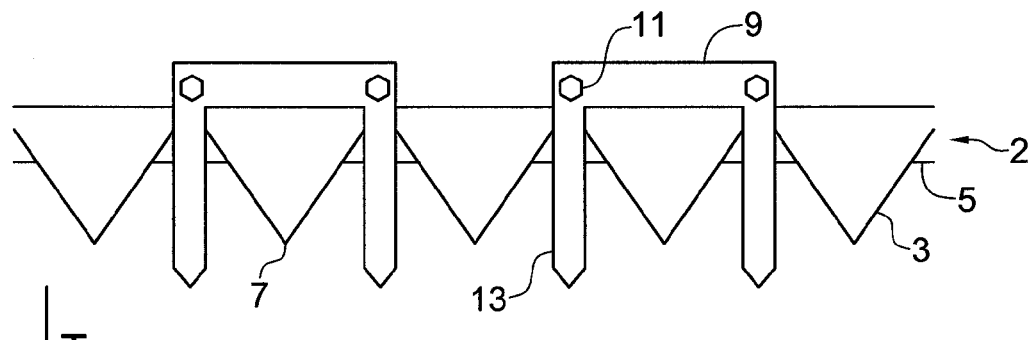
FIG. 1 is a schematic top view of a prior art header where guard fingers and guard bolts are aligned in the operating travel direction.
Figure 2:
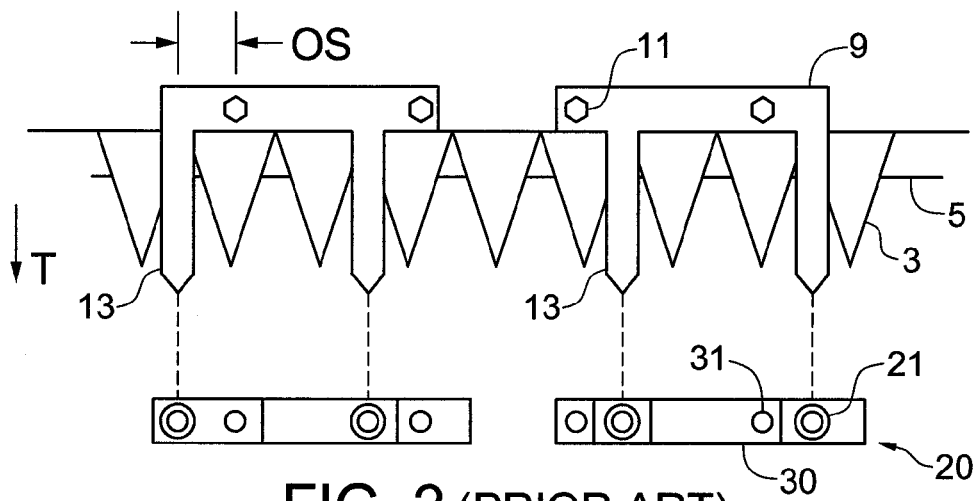
FIG. 2 is a schematic top view of an alternate prior art header where guard fingers and guard bolts are offset in the operating travel direction.

A typical cutting header comprises a knife bar extending along the front lower edge of the header, with, as schematically illustrated in FIGS. 1 and 2, a plurality of triangular knife sections 3 attached to the bar 5 such that the apex 7 of the triangle extends forward from the bar 5. Guards 9 are attached to the front lower edge of the header with guard bolts 11 and serve to protect the knife sections 3 from breakage when contacting stones and like obstructions. The guards 9 comprise pointed guard fingers 13 extending forward.

Conventional crop lifters are available from a variety of manufacturers in a variety of styles. The mounting system for many of these crop lifters requires that the guard fingers 13 and guard bolts 11 mounting the guard 9 to the header must be aligned in the operating travel direction T as illustrated in FIG. 1.

On the majority of headers the guard bolts 11 and fingers 13 are aligned as schematically illustrated in FIG. 1, however in some harvest headers, the guard bolts 11 are offset at varying offset distances OS to one side or the other from the guard fingers 13, as illustrated in FIG. 2. Many commonly available crop lifters can not then be used with these headers, and more costly and less convenient options must be used.

Figure 6:
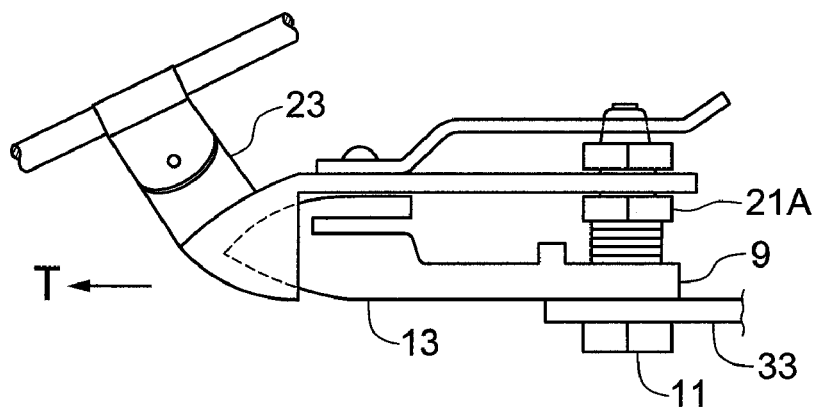
FIG. 6 is a schematic side view of a crop lifter mounted on a guard where the guard finger and guard bolt are aligned in the operating travel direction, and where the header attachment member is mounted above the header.
Figure 7:
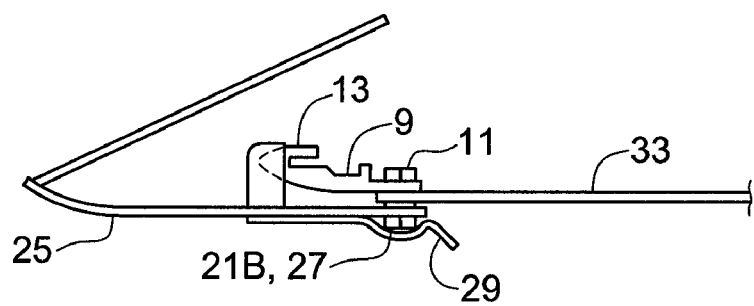
FIG. 7 is a schematic side view of an alternate crop lifter mounted on a guard where the guard finger and guard bolt are aligned in the operating travel direction, and where the header attachment member is mounted below the header.

The present invention therefore provides a guard finger attachment apparatus 20 for attaching a crop accessory to a cutting header where guard bolts 11 attaching guards 9 to the header are offset from guard fingers 13 of the guards. The crop accessory such as a crop lifter, examples of which are illustrated in FIGS. 6 and 7, is of the type that is adapted for engagement with a header attachment member 21 and a guard finger 13 when the header attachment member 21 is aligned with the guard finger 13. In a header configured as illustrated in FIG. 1, the header attachment member 21 is simply attached to the guard bolt. When using the crop lifter 23 of FIG. 6, the header attachment member 21A replaces the nut on the guard bolt 11 and the crop lifter 23 is configured to engage the guard finger 13 and the header attachment member 21A screwed on to the guard bolt 11 above the guard 9, which are aligned in the operating travel direction T.

Similarly when using the crop lifter 25 of FIG. 7, the header attachment member 21B is provided by the nut 27 on the guard bolt 11 under the guard 9 and the crop lifter 25 includes a clip 29 configured to engage the nut 27. The crop lifter 25 engages the guard finger 13 and the header attachment member 21B provided by nut 27 which again are aligned in the operating travel direction T.

The embodiment of the guard finger attachment apparatus 20 schematically illustrated in FIG. 2 comprises a plate 30 attachable to the header by two guard bolts 11, and two header engagement members 21 are attached to the plate 30 and are configured such that when the plate 30 is attached to the guard bolts 11, each header engagement member 21 is aligned with a guard finger 13.

In the schematic top view of FIG. 2, the apparatus 20 is shown forward of the guards 9. The plate 30 defines bolt holes 31 aligned with the guard bolts 11, and header attachment members 21 are attached to the plate by welding, bolts, or the like such that the header attachment members 21 are aligned with the guard fingers 13.

Figure 3:
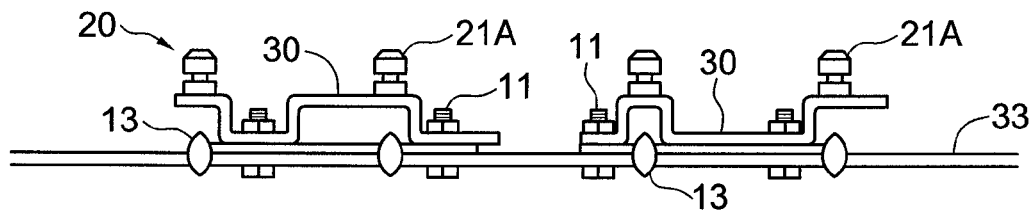
FIG. 3 is a schematic front view of an embodiment of the apparatus where the header attachment members are mounted above the header.

The plate 30 is attachable to a top side of the header 33 in the schematic front view of FIG. 3 to accommodate a crop lifter such as shown in FIG. 6 where the header attachment member 21A is above the guard 9 and header 33. The plate 30 is attachable to a bottom side of the header 33 in FIG. 4 to accommodate a crop lifter 25 such as shown in the schematic front view of FIG. 7 where the header attachment member 21B is under the guard 9 and header 33.

Figure 4:
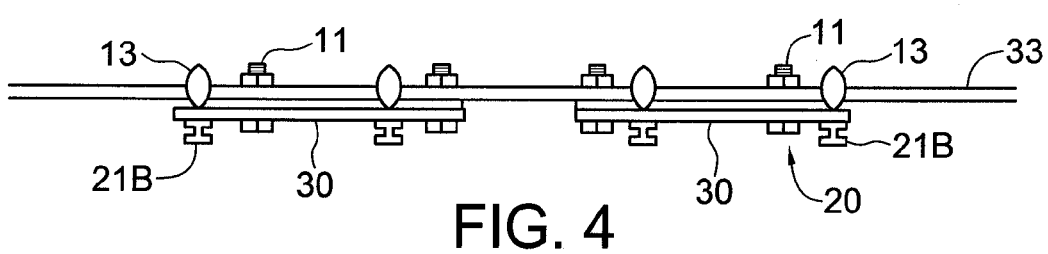
FIG. 4 is a schematic front view of an alternate embodiment of the apparatus where the header attachment members are mounted under the header.

As seen in the FIGS. 3 and 4 the plate 30 can be configured to include a raised center section between the two guard bolts 11, or as otherwise required, in order to avoid hold down clips, and like parts that may be present as part of the knife arrangement on the header 33.

Figure 5:
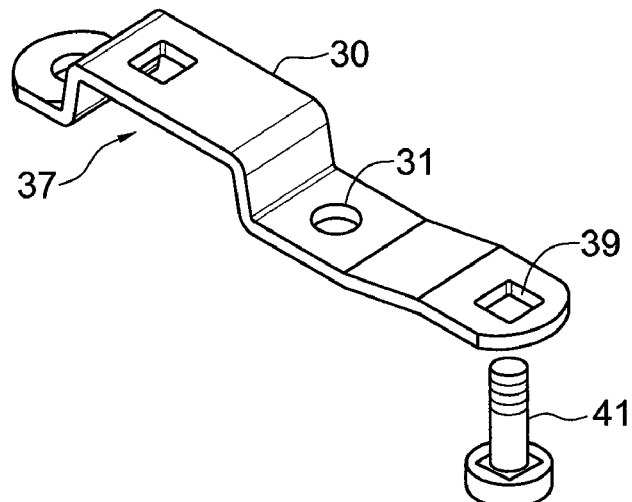
FIG. 5 is a perspective view of a plate of the apparatus.

Another shape of plate 30 is illustrated in FIG. 5 with the raised area 37 between bolt holes 31. In the plate 30 of FIG. 5, header attachment members are attached by further bolts through holes 39. The header attachment member 21 can comprise simply bolts 41 through the holes 39 in the plate 30, attaching the crop lifter or like crop accessory to the plate.

Thus the guard finger attachment apparatus 20 can be configured to provide an aligned guard finger 13 and header attachment member 21 where the guard bolts and guard fingers are offset in the operating travel direction T as in some types of harvest headers.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A guard finger attachment apparatus for attaching a crop accessory to a cutting header where vertically oriented guard bolts attach guards to the header such that guard fingers of the guards extend forward from the header, and wherein the vertically oriented guard bolts are offset from the guard fingers, the crop accessory adapted for engagement with a header attachment member and a guard finger when the header attachment member is aligned with the guard finger behind the guard finger, the apparatus comprising:
   a plate attachable to the header by at least one guard bolt; and
   at least one header engagement member attached to the plate and configured such that when the plate is attached to the at least one guard bolt, the at least one header engagement member extends substantially vertically from the plate and is aligned with a guard finger behind the guard finger.

2. The apparatus of claim 1 wherein the plate is attachable to a bottom side of the header such that the header attachment member is aligned with the guard finger below the guard finger.

3. The apparatus of claim 1 wherein the plate is attachable to a top side of the header such that the header attachment member is aligned with the guard finger above the guard finger.

4. The apparatus of claim 1 wherein the plate is attachable to two guard bolts.

5. The apparatus of claim 3 wherein the plate includes a raised center section between the two guard bolts.

6. The apparatus of claim 1 wherein the header attachment member comprises a bolt through a corresponding hole in the plate.

7. A cutting header apparatus comprising:
   a header including vertically oriented guard bolts attaching guards with guard fingers to the header, such that the guard fingers extend forward from the header;
   wherein at least one guard finger of at least one guard is offset from guard bolts attaching the at least one guard to the header;
   a plate attached to the header by the guard bolts attaching the at least one guard to the header; and
   a header engagement member attached to the plate and configured such that the header engagement member extends substantially vertically from the plate and is aligned with an offset guard finger of the at least one guard behind the offset guard finger;
   a crop accessory engaged with the header attachment member and engaged with the aligned offset guard finger.

8. The apparatus of claim 7 wherein the plate is attached to a bottom side of the header such that the header attachment member is aligned with the guard finger below the guard finger.

9. The apparatus of claim 7 wherein the plate is attached to a top side of the header such that the header attachment member is aligned with the guard finger above the guard finger.

10. The apparatus of claim 7 wherein the plate is attached to two guard bolts.

11. The apparatus of claim 9 wherein the plate includes a raised center section between the two guard bolts.

12. The apparatus of claim 7 wherein the header attachment member comprises a bolt through a corresponding hole in the plate.

* * * * *